United States Patent [19]

Klimczak

[11] Patent Number: 4,632,679
[45] Date of Patent: Dec. 30, 1986

[54] CLEANING AIR MANIFOLD WITH BACK DRAFT DAMPER

[75] Inventor: William J. Klimczak, Anoka, Minn.
[73] Assignee: Carter-Day Co., Minneapolis, Minn.
[21] Appl. No.: 778,903
[22] Filed: Sep. 23, 1985
[51] Int. Cl.⁴ ............................................. B01D 46/04
[52] U.S. Cl. ........................................ 55/284; 55/291; 55/294; 55/302
[58] Field of Search ............... 55/284, 285, 291, 293, 55/294, 302, 341 R

[56] References Cited

U.S. PATENT DOCUMENTS

| | | | |
|---|---|---|---|
| 3,487,609 | 1/1970 | Caplan | 55/341 R |
| 3,777,458 | 12/1973 | Dence | 55/341 R |
| 3,951,627 | 4/1976 | Barr, Jr. et al. | 55/341 R |
| 4,293,320 | 10/1981 | Robinson | 55/341 R |
| 4,373,939 | 2/1983 | Limbocker | 55/341 NT |
| 4,468,240 | 8/1984 | Margraf | 55/294 |

FOREIGN PATENT DOCUMENTS 2450751 3/1976 Fed. Rep. of Germany ........ 55/294

Primary Examiner—Kathleen J. Prunner

[57] ABSTRACT

A moving manifold for back flushing open-mouthed filter bags so that the dust accumulated on the bags exterior is dislodged. The manifold distributes both continuously blower driven air and high pressure air from pulsed jets for back-flushing the bags. A back draft damper installed in the manifold is opened by the decreased pressure created when the high pressure air is activated in order to reduce structural stresses on the manifold and reduce the power required for the blower drive.

3 Claims, 3 Drawing Figures

CLEANING AIR MANIFOLD WITH BACK DRAFT DAMPER

SUMMARY OF THE INVENTION

This invention deals generally with gas separation and more specifically with air cleaning by means of a filter media which uses reverse flushing.

Multiple bag or sleeve filter assemblies are quite common in industrial installations. Typically, such filters are constructed of multiple bags or closed sleeves hanging vertically from an air sealed plate, called a tube sheet, which separates clean air from dirty air. Usually, the space below the plate includes an entry for the dirty air, and clean air exits above the plate. The long cylindrical bags hang down into the dirty air chamber, and the air moves through the bag walls, into the volume enclosed by the bag, and out the bag mouth at the top of the bag which is open to the clean air chamber above the bag attachment plate. Dust and other solid contaminates are separated from the air as it passes through the bag wall, and the dust is trapped on the outside of the bag and clings to it.

In order to clean the filter bags the dust is blown away from or knocked loose from the outside of the bags, so that it falls to the bottom of the dirty air chamber from which it is removed mechanically. This cleaning operation uses reverse air flow into the mouth of the bag to push the dust off the outside so that the dust will be knocked off the outside of the bag. The most common method of cleaning the bag is by the use of a sharp pulse of compressed air which is blown back through the bag, that is, into the bag's open mouth. This system has the advantage of being operable even while the normal dust laden air is still flowing, since no mechanical contact is made with the bag. The pulsed reverse air system functions because the normal air flow is produced by fans or blowers which furnish low volume and relatively low pressure air, while the pulsed reverse air is of higher pressure and much higher volume. The higher pressure reverse jet air flow, therefore, overcomes the normal low pressure air and enters the bag mouth. The reverse air is generally sequentially activated on a limited number of bags and it operates cyclically to eventually affect all the bags.

The basic premise upon which the pulsed reverse air system operates is that the pulse of air traveling down through the bag, from the open mouth top to the closed end, cleans the bag from top to bottom. The trapped agglomerate is dislodged and falls to the bottom of the dirty air chamber.

The present invention uses a new approach to provide the back-flushing of the filter bags to dislodge the dust which accumulates on their exteriors.

It is based on the recognition that high pressure, high volume reverse air flow through the sides of the bag will also dislodge dust from the bag exterior, and that, in fact, the combination of reverse air through the bag fabric, along with the pulse jet air through the bag, will clean the bag more thoroughly than either alone. The reverse air flow through the fabric is supplied by a blower which need only overcome the air pressure of the forward air flow in order to reverse the air movement through the fabric.

This blower is attached to and feeds a moving manifold which sequentially covers groups of, but not the entire configuration of, the bags, so that, while the pressure must surpass that of the forward air, the volume of air delivered by the reverse blower need not be comparable to the total forward air flow.

Since the best cleaning action is secured when the higher volume blower fed reverse air and the pulse jet air operate simultaneously on the bags being cleaned, te reverse air manifold actually includes both reverse air supplies. While the low volume, lower pressure reverse air is supplied by a blower attached to and moving with the manifold, the higher volume, higher pressure pulse jet air is supplied by means of a rotating, sliding or other moving connection from a compressed air source. The two sources of reverse air are constructed to align with the bag mouths simultaneously, and the reverse blower air operates continuously, while the reverse pulsed air is timed with the movement of the manifold to be operated when its jet nozzles are exactly aligned with the mouths of the group of bags being cleaned.

However, this simultaneous operation of two sources of air with widely different air flow characteristics leads to problems which require more than merely placing the two sources adjacent to each other.

When pulse jets are used alone their high velocity air flow induces considerable additional air flow into the bag mouth from the surrounding air. This induction of air is, however, no problem when the entire volume of the clean air region of the filter assembly is available to supply induced air.

However, when the pulse jets are used together with blower fed reverse air, the geometry is such that it requires the jets to be located within the relatively air tight blower manifold, and the air flow patterns are dramatically altered. In such a situation, operation of the pulse jets results in several undesirable phenomena.

One is that induced air flow attempts to enter the manifold through the blower. This causes the induced air to actually attempt to drive the blower at faster than rated flow while it is being powered. The result can be drive damage and most certainly higher blower power consumption.

Moreover, the blower resists the induced air and thereby produces a pressure differential between the inside and outside of the manifold. This pressure differential, in turn, creates mechanical stresses on the manifold and therefore requires a stronger, heavier, more costly manifold structure.

In practical systems, the difficulties encountered with the use of the combination of blower fed and pulse jet reverse air may outweigh the advantages gained from its use.

The present invention, however, counteracts the problems resulting when combining blower-fed and pulse jet reverse air in a simple and inexpensive manner and therefore makes the combined use practical and operational.

To solve the problems, a back draft damper is added to the reverse air manifold. This damper is essentially a valve with unidirectional flow characteristics, a check valve, and although it normally prevents air flow out from the manifold, when the manifold has a lower pressure inside than outside in the surrounding clean air chamber, the back draft damper permits air to flow into the manifold. Thus, when the pulse jets are activated and induce air flow from within the manifold, causing a reduced pressure inside the manifold, the back draft damper opens, and supplies additional induced air to the bag mouths. However, at all other times, when the reverse blower creates a somewhat higher air pressure within the manifold than outside it, the back draft damper is closed and blower air only flows out the air exits which align with the bag mouths.

The induced air does not, therefore, attempt to enter through the reverse air blower and no forces are developed upon the reverse air manifold, beyond those for which it is designed.

The addition of the back draft damper to the reverse air manifold makes the combination of reverse blower-fed high volume air and pulse jet air practical for use and therefore results in more efficient cleaning of bag filters.

DETAILED DESCRIPTION OF THE INVENTION

Figure 1:
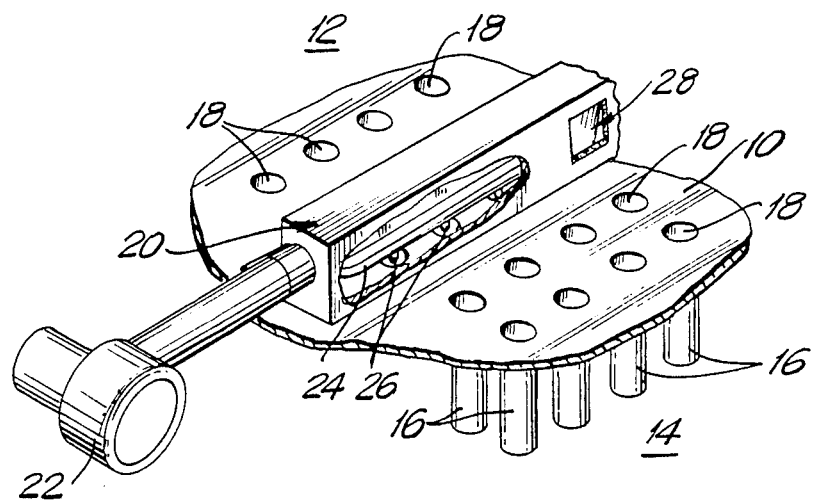
FIG. 1 is a perspective view of the preferred embodiment of the bag cleaning apparatus of the invention.

The preferred embodiment of the invention is depicted in FIG. 1 where tube sheet 10 separates clean air chamber 12 from dirty air chamber 14. Filter bags 16 extend from tube sheet 10, to which they are attached. Bag mouths 18 are open at tube sheet 10 and all air flow between clean air chamber 12 and dirty air chamber 14 passes through bag mouths 18.

The normal filtering action takes place as dirty air is moved by a fan or blower (not shown) from chamber 14, through the porous walls of bags 16, out bag mouths 18 and into chamber 12. Dust and other contaminates can not pass through the bag walls and remain on the outside of the bags, the side actually within chamber 14.

This dirt trapped on the outside of the bags is then dislodged, as later described, and falls to the bottom of chamber 14 where it is mechanically removed. The present invention addresses the apparatus which is used to dislodge the dirt from the outsides of bags 16.

Air manifold 20 furnishes reverse flowing air, actually two types of reverse flowing air, to dislodge the dirt from the outside of bags 16. Air manifold 20 is moved along tube sheet 10 by means (not shown) well established in the art, such as rotating it around one of its own ends to cover a circular tube sheet, to sequentially act upon a limited number of bags at any one time, but to clean all the bags in the assembly within a resonably short time.

Blower 22 furnishes relatively low pressure high volume air to manifold 20 from which it enters the bag mouths 18 which are directly under it through holes 23 (see FIG. 2) in the bottom of manifold 20 which match the pattern of bag mouths 18 on tube sheet 10. The air produced by blower 22 is of such pressure and volume that when manifold holes 23 are aligned with bag mouths 18, the air flow in bags 16 actually reverses and moves from the mouth of the bag, down the bag and out through the porous sides. This action helps to dislodge dirt which has previously accumulated on the bag sides. Although the blower pressure exceeds the pressure of the forward air supply, it is still a relatively low pressure. Moreover, although the air volume moved by blower 22 is far less than the forward air volume moving from dirty air chamber 14 to clean air chamber 12, the limited number of bags being acted upon at any one time permits relatively small blower 22 to effectively move air through all the bags upon which it acts.

Figure 2:
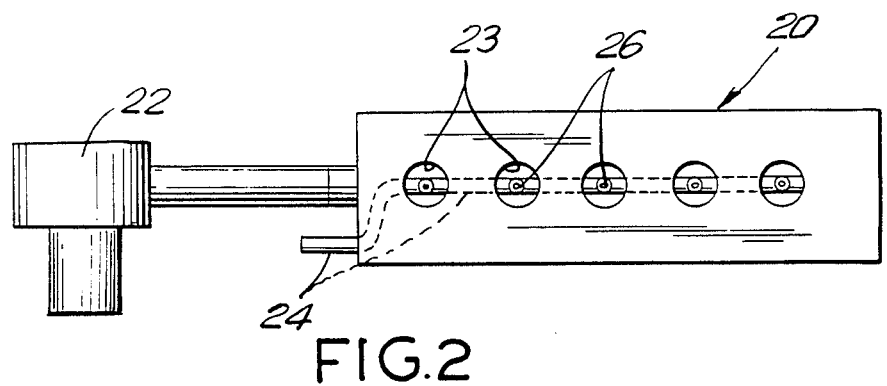
FIG. 2 is a plan view of the bottom of the manifold of the preferred embodiment.

High pressure manifold 24 also is mounted within manifold 20, and jet nozzles 26 are constructed to align with the air exit holes 23 on the underside of manifold 20 as seen in FIG. 2. Jet nozzles 26 provide the second type of reverse cleaning air, high pressure pulse jets of air which cause a shock wave to travel down filter bags 16, through the sidewalls of the bags and dislodge the dirt. Since the reverse jet pulse is of very short duration, it is timed to occur only when air jets 26 are aligned with bag mouths 18, and occurs for a relatively short time compared to the time the reverse blower driven air affects the bag.

While each of the two types of reverse cleaning air flow are known to operate quite satisfactorily alone, attempts at their combined use has led to difficulties. As noted above, the induced air flow caused by the action of the pulsed jet of air can cause blower 22 to be subjected to destructive action and it produces potentially damaging forces on the structure of air manifold 20.

To prevent these effects back draft damper 28 is included in manifold 20. Back draft damper 28 functions to permit only unidirectional air flow from clean air chamber 12 into air manifold 20.

Figure 3:
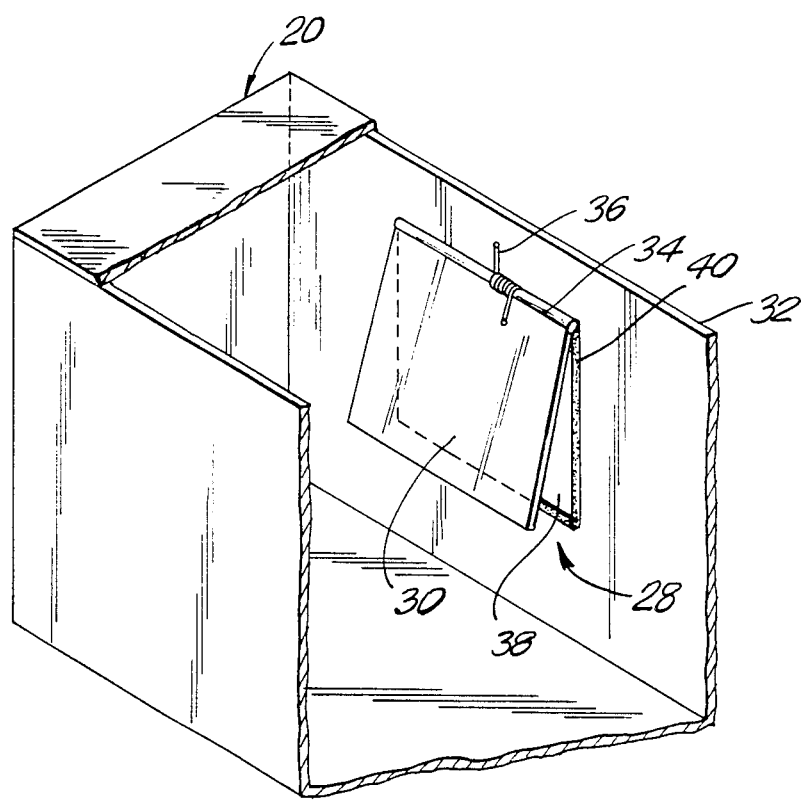
FIG. 3 is a cutaway view of the manifold showing the type of back draft damper used in the preferred embodiment.

A simple form of back draft damper 28 is shown in FIG. 3 which is a cutaway view of manifold 20. For this unit, a simple flap 30 is located in side 32 of air manifold 20. Flap 30 pivots upon hinge 34 and is forced by spring 36 against opening 38 which has air seal 40 around its periphery. Since flap 30 overlaps opening 38 and can only move inward, higher air pressure inside manifold 20 will only help seal flap 30 against air seal 40 and prevent air flow out through opening 38. Lower air pressure inside manifold 20, as when pulse jets 26 are activated and cause induced air flow, will however cause flap 30 to swing open and permit air flow into manifold 20.

Back draft damper 28 thus normally prevents reverse blower driven air from passing out into clean air chamber 12, but, when the air pressure differential exceeds the force of spring 36, induced air will enter manifold 20 by opening flap 30 and neither the structure of manifold 20 nor blower 22 will be harmed.

The back draft damper therefore make it possible for the first time to combine both blower driven reverse air with pulse jet reverse air and thus derive the dust removing benefits of both.

It is to be understood that the form of this invention shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other mechanical configurations can be used for back draft damper 28. Moreover high pressure manifold 24 need not be enclosed within air manifold 20, but could consist of piping external to air manifold 20.

What is claimed as new and for which Letters Patent of the United States are desired to be secured is:

1. In a gas filter apparatus of the type which has a manifold which furnishes cleaning air to the mouth openings of bag filters so that the cleaning air passes from the open mouths of the bags into the bags and dislodges dirt which has previously accumulated on the outside of the bags, the improvement comprising:

a cleaning air manifold structure with a plurality of exit openings in a pattern which matches the pattern of mouth openings of bags within the filter apparatus, and which is located so the manifold exit openings are adjacent to and in alignment with the bags' mouth openings;

blower means interconnected with and furnishing air to the cleaning air manifold structure;

a plurality of air jets adjacent to the exit openings of the cleaning air manifold structure, each air jet located so its jet discharge of air coincides with the air from a manifold exit opening;

high pressure air manifold means interconnecting the air jets and supplying them with high pressure air, and also interconnected with a source of high pressure air; and back draft damper means connected to the cleaning air manifold and allowing a unidirectional flow of air, into the cleaning air manifold, when the air pressure inside the cleaning air manifold is below the air pressure outside it.

2. The improved gas filter apparatus of claim 1 wherein the cleaning air manifold moves relative to the bag mouths so that the cleaning air acts sequentially on groups of bag mouths.

3. The improved gas filter apparatus of claim 1 wherein the high pressure air manifold and the air jets are located within the cleaning air manifold.

* * * * *